Dec. 31, 1957          K. FRANCK          2,818,500

PRISMATIC REFLECTORS

Filed July 3, 1953

INVENTOR
KURT FRANCK
BY
ATTORNEY

United States Patent Office 2,818,500
Patented Dec. 31, 1957

2,818,500

PRISMATIC REFLECTORS

Kurt Franck, Newark, Ohio, assignor to Holophane Company, Inc., New York, N. Y., a corporation of Delaware Application July 3, 1953, Serial No. 365,974

3 Claims. (Cl. 240—106)

The present invention relates to prismatic reflectors and is more particularly directed toward prismatic reflectors of the type having an incident surface through which light is transmitted, with or without refraction, and having an opposed surface in the form of ribs whose sides effect two total reflections of the light in the medium and return it to the incident surface for retransmission in a plane parallel with that of the incident light.

When such totally reflecting prisms are embodied in pressed glass products, the limitations of mold making and molding processes makes it impossible to achieve mathematical precision of the reflecting surfaces all the way to the apices of the prisms and in the valleys between them, with subsequent light loss and leakage into unwanted directions.

The present invention contemplates improvements in such reflectors whereby it is possible to avoid the loss of light at the apices of the prisms, also the loss of light at the valleys between the prisms. To carry out these objects, the optically opposite surfaces are so disposed that the light refracted at the incident surface is directed into directions such that it does not reach the rounded apices or the concave valleys so that those surfaces cannot receive the light rays coming in directions where total reflection is desired.

The accompanying drawings show, for purposes of illustrating the present invention, several embodiments in which the invention may take form, it being understood that the drawings are illustrative of the invention rather than limiting the same.

Figure 1:
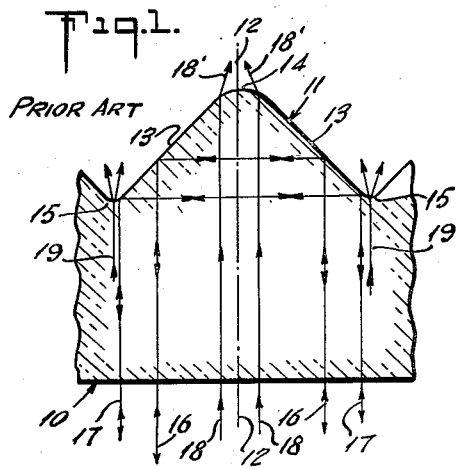
Figure 1 is a sectional, diagrammatic view showing light reflection and leakage in typical prior art, total reflecting prisms.

The typical prior art type totally reflecting prism of a piece of pressed glassware is illustrated in Figure 1. Such a structure typically has a smooth, light-incident surface indicated at 10 and an opposed surface composed of symmetrical prisms generally indicated at 11. These prisms are symmetrical about a median plane 12, 12 and have sides 13, 13 which make angles of 45° with the bisecting or median plane. The median plane is indicated as normal to the incident surface, but may, as indicated in Patent No. 1,612,804, be oblique. As the reflecting prisms are formed in metal molds, it is not practical to obtain mathematical precision at the apices of such prisms. They are rounded as indicated at 14, Figure 1. There are also narrower, but readily discernible fillets or valleys between the adjacent prisms, as indicated at 15, 15. The sides 13, 13 of the prism are effective to return rays, such as 16 and 17, on parallel paths so that a ray falling on the totally reflecting surface at angles for total reflection is returned to the incident surface 10 for transmission parallel to its original direction. Rays such as 18, 18 close to the bisecting plane 12 strike the rounded surface 14, which acts as a condensing lens, transmitting and converging them as indicated at 18′, 18′. This transmission of light involves leakage of a substantial amount of the total light flux, perhaps on the order of 10% to 15%, and as the emitted light is coming from narrow regions, the apices of pressed glass reflecting prisms are of relatively high brightness. Light rays such as 19, 19 falling on the valleys or fillets 15 between the prisms are also transmitted and spread as though coming from a concave lens as indicated in Figure 1. The curved valleys are narrow and the light losses there are generally much less than the light loss at the apex of the prism.

Figure 2:
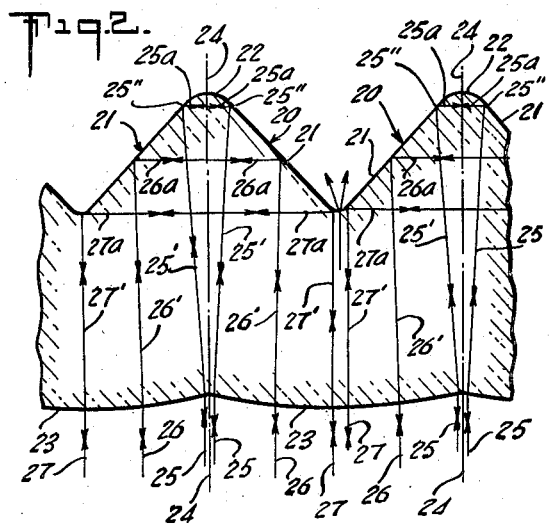
Figure 2 is a view similar to Figure 1, illustrating an improved construction in which light is kept off the apices of the prisms.

Figure 2 illustrates a new form of construction in which the light is kept off the rounded apices of the reflecting prisms. Here totally reflecting prisms are indicated at 20, having sides 21, 21 and rounded apices 22. These prisms appear in the drawing to be about the same as those shown in Figure 1. The incident surface, however, instead of being generally rectilinear, is here made up of a number of contiguous, shallow flutes 23, 23, centered on the bisecting planes 24, 24 of the prisms 20. The general direction of this surface is, for convenience, shown normal to the bisecting plane. The flutes 23 are convex toward incident light and have such refracting power as to divert rays 25, 25 close to the bisecting plane, as indicated at 25′, 25′, and cause these rays to strike the opposed surface of the reflecting prisms 22 at 25″, 25″ beyond the rounded surface 22 at the apex of the prisms, where they are totally reflected as at 25a.

Other rays such as 26, 26 and 27, 27 are deviated with slight convergence, as indicated at 26′, 27′, so as to strike the sides 21, 21 of the prisms and are totally reflected, as indicated at 26a, 27a, respectively.

The rays 27, 27 which strike the reflecting surface near the roots of the prisms do not suffer any deviation by the flutes 23, 23. Hence, near the valleys, between the surfaces of the reflecting prisms, the slope would be the same as that of the prisms of Figure 1, i. e., 45°.

Inasmuch as the rays between 25 and 27 are somewhat condensed or concentrated by the convex surface 23, it is necessary to slightly adjust the profile of the prism sides 21, 21 to assure that the cross-reflected rays such as 25a, 26a, 27a will be at right angles to the bisecting or median plane 24, 24. This refinement requires that the surfaces 21, 21 be slightly convex to the internal, totally reflected light, or concave as viewed from the outside. This refinement may or may not be applied, as desired.

Figure 3:
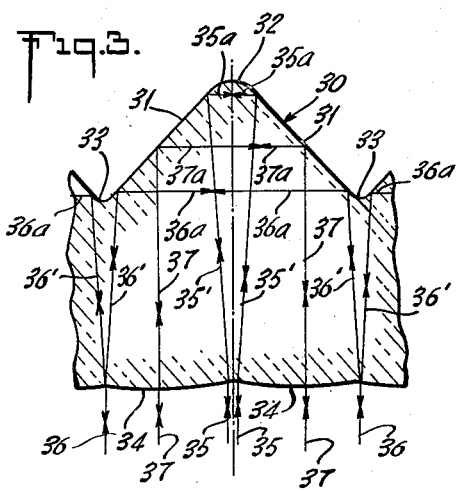
Figure 3 is a view similar to Figure 1, illustrating a modified form of construction in which the light is kept off both the apex of the prism and the fillets interconnecting one prism with the next.

Figure 3 illustrates a further refinement in the contour of the opposed surfaces of the reflector. Here the reflecting prism is indicated at 30, with sides at 31, 31, its rounded apex at 32, and the rounded fillets between the prisms are indicated at 33, 33. The incident surface of the reflector is provided with convex flutes 34, each of half the width of the prism 30. Rays such as 35, 36 are concentrated as indicated at 35′, 36′, so that they do not fall on either the rounded apex or the rounded fillet. These rays, as well as the intermediate rays 37, 37, are totally reflected as indicated at 35a, 36a and 37a. The profile of the sides 31, 31 of the prism 30 may or may not be adjusted to maintain the reflected rays 35a, 36a, 37a at right angles to the bisecting plane, as desired.

Figure 4:
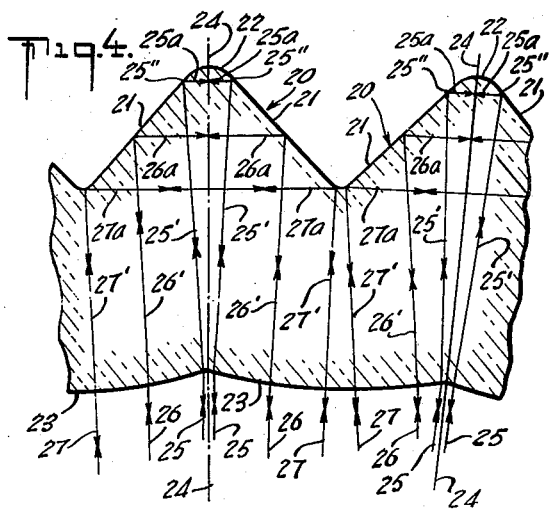
Figure 4 is a view similar to Figure 2, illustrating the action taking place in an annular or rounded prismatic reflector.

In the arrangement shown in Figure 4, two prisms such as 20, 20 of Figure 2 are radially disposed on an annular reflecting body of large diameter. The same reference characters used in Figure 2 are used for the corresponding rays in Figure 4.

Figure 5:
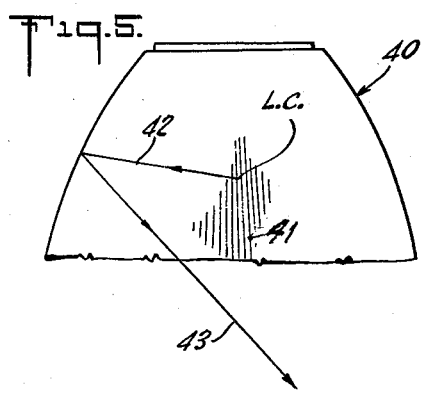
Figure 5 is a side elevational view of an annular reflector embodying the new reflecting prism.

Figure 5 is a diagrammatic side elevational view of an annular reflector 40 provided with radial reflecting prisms 41 which may be of the character shown in Figures 2 and 3. The inner flutes are also radial. The light center is indicated at LC and typical incident and reflected rays in the plane of the sheet are indicated at 42 and 43. Change in vertical angle of the reflected rays may be obtained by variation of profile or by inner annular refracting ribs which carry the flutes.

Figure 6:
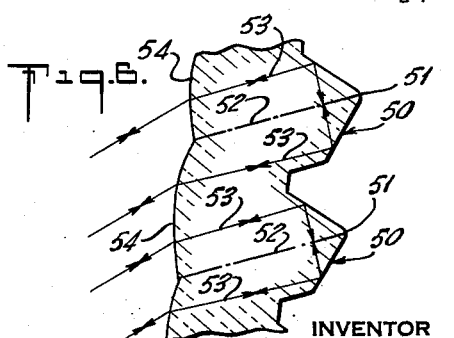
Figure 6 is an enlarged, sectional view of a further modification.

Figure 6 illustrates a reflector as in Patent No. 1,612,804, receiving light obliquely to its general direction. Here the reflecting prisms 50 with rounded apices 51, as above discussed, have tilted bisecting planes 52 medial of the refracted rays 53 in the reflector, and the curved surfaces 54, though physically displaced from the reflecting surfaces, are optically opposite them.

The foregoing construction makes it possible to substantially reduce the leakage of light from prismatic reflectors. It also reduces the brightness of the outer surface of such reflectors, particularly at the peaks of the reflecting ridges or ribs.

Since it is obvious that the invention may be embodied in other forms and constructions within the scope of the claims, I wish it to be understood that the particular forms shown are but several of these forms, and various modifications and changes being possible, I do not otherwise limit myself in any way with respect thereto.

What is claimed is:

1. A pressed glassware prismatic reflector, said reflector being transparent and having an inner light incident surface and an outer surface, said outer surface being composed of symmetrical double reflecting prisms, each prism being formed of two reflecting surfaces joined by an apex, each of said apexes of said prisms defining a curved portion interconnecting the two light reflecting surfaces of its associated prisms, each prism having a median bisecting plane extending through the apex thereof, said inner surface having a series of flutes, each of said flutes extending from one of said planes to the next adjacent one of said planes and having a width equal to the distance between adjacent ones of said median planes, each of said flutes being convex and being of a refracting power to deviate light parallel to and adjacent to its adjacent bisecting planes away from the rounded apexes associated with said planes.

2. A reflector as set forth in claim 1 wherein adjacent prisms are joined by concave fillets intermediate said bisecting planes, and the flute width equals one-half the distance between said bisecting planes, with said flutes having a refracting power to also deviate light parallel to and intermediate said planes away from said fillets.

3. A reflector as set forth in claim 1 wherein said reflector is annular in shape.

References Cited in the file of this patent

UNITED STATES PATENTS

| | | |
|---|---|---|
| 1,259,493 | Dorey | Mar. 19, 1918 |
| 1,758,977 | Rolph | May 20, 1930 |
| 1,838,971 | Whitaker et al. | Dec. 29, 1931 |

FOREIGN PATENTS

| | | |
|---|---|---|
| 8,324 | Great Britain | 1909 |
| 47,274 | Austria | Apr. 10, 1911 |
| 608,044 | France | Apr. 10, 1926 |
| 294,069 | Great Britain | July 19, 1928 |